(12) United States Patent
Weisenburger et al.

(10) Patent No.: US 11,513,237 B2
(45) Date of Patent: Nov. 29, 2022

(54) GNSS SATELLITE LINE OF SIGHT DETECTION

(71) Applicant: Trimble Inc., Sunnyvale, CA (US)

(72) Inventors: Shawn Weisenburger, Denver, CO (US); Gregory Wallace, Arvada, CO (US)

(73) Assignee: Trimble Inc., Sunnyvale, CA (US)

(*) Notice: Subject to any disclaimer, the term of this patent is extended or adjusted under 35 U.S.C. 154(b) by 214 days.

(21) Appl. No.: 16/932,465

(22) Filed: Jul. 17, 2020

(65) Prior Publication Data

US 2022/0018973 A1 Jan. 20, 2022

(51) Int. Cl.
| | |
|---|---|
| *G01S 19/22* | (2010.01) |
| *G01S 19/48* | (2010.01) |
| *G06T 7/70* | (2017.01) |
| *G01S 19/43* | (2010.01) |

(52) U.S. Cl.
CPC ............ *G01S 19/485* (2020.05); *G01S 19/22* (2013.01); *G01S 19/43* (2013.01); *G06T 7/70* (2017.01); *G06T 2207/10032* (2013.01)

(58) Field of Classification Search
CPC .......... G01S 19/22; G01S 19/45; G01S 19/47; G01S 19/485; G06T 7/70
USPC ........................................................ 342/352
See application file for complete search history.

(56) References Cited

U.S. PATENT DOCUMENTS

| | | | |
|---|---|---|---|
| 9,804,270 B2 | 10/2017 | Wietfeldt et al. | |
| 10,516,999 B1* | 12/2019 | Desai | G06V 20/176 |
| 2007/0237403 A1* | 10/2007 | Keith | H04N 19/60 |
| | | | 382/232 |
| 2012/0293365 A1 | 11/2012 | Ashjaee et al. | |
| 2017/0045623 A1* | 2/2017 | Zlogar | G01S 3/14 |
| 2018/0196143 A1 | 7/2018 | Nishi et al. | |
| 2018/0335525 A1 | 11/2018 | Niesen et al. | |

OTHER PUBLICATIONS

Extended European Search Report for Application No. 21183644.0-1205, dated Dec. 17, 2021, 7 pages.

* cited by examiner

*Primary Examiner* — Harry K Liu
(74) *Attorney, Agent, or Firm* — Kilpatrick Townsend & Stockton

(57) ABSTRACT

Disclosed are techniques for processing satellite signals for computing a geospatial position. A plurality of GNSS signals are received from a plurality of GNSS satellites. An image is captured using an imaging device at least partially oriented toward the plurality of GNSS satellites. The image is segmented into a plurality of regions based on RF characteristics of objects in the image. An orientation of the image is determined. The plurality of GNSS satellites are projected onto the image based on the orientation of the image such that a corresponding region is identified for each of the plurality of GNSS satellites. Each of the plurality of GNSS signals is processed in accordance with the corresponding region.

20 Claims, 15 Drawing Sheets

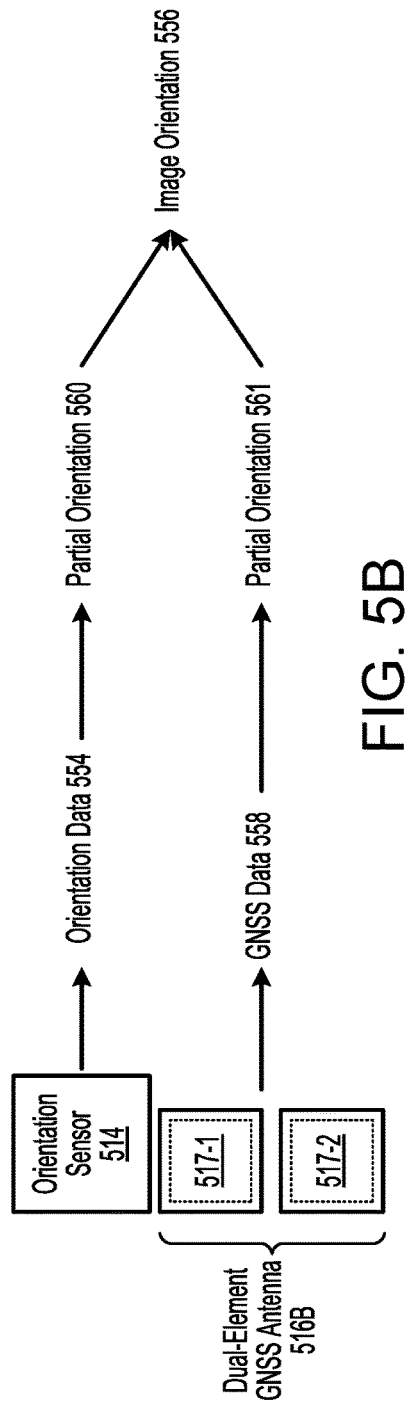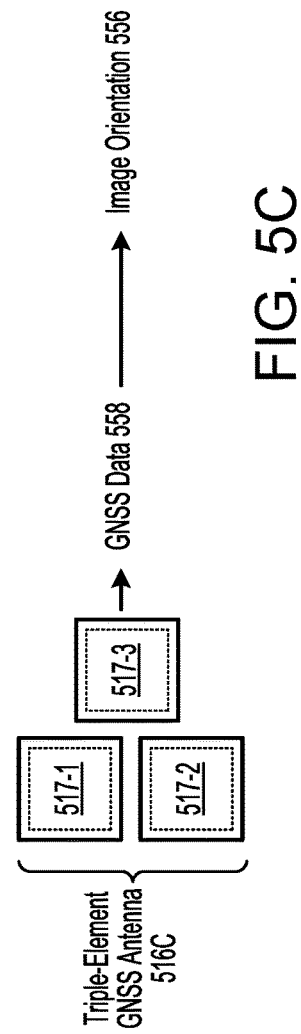

GNSS SATELLITE LINE OF SIGHT DETECTION

BACKGROUND OF THE INVENTION

Global navigation satellite systems (GNSS) are systems that use medium Earth orbit (MEO) satellites to provide geospatial positioning of receiving devices. Typically, wireless signals transmitted from such satellites can be used by GNSS receivers to determine their position, velocity, and time. Examples of currently operational GNSSs include the United States' Global Positioning System (GPS), Russia's Global Navigation Satellite System (GLONASS), China's BeiDou Satellite Navigation System, the European Union's (EU) Galileo, Japan's Quasi-Zenith Satellite System (QZSS), and the Indian Regional Navigation Satellite System (IRNSS). Today, GNSS receivers are used in a wide range of applications, including navigation (e.g., for automobiles, planes, boats, persons, animals, freight, military precision-guided munitions, etc.), surveying, mapping, and time referencing.

The accuracy of GNSS receivers has improved drastically over the past few decades due to several technological improvements. One such improvement is the use of differential measurement techniques, in which GNSS signals received by a fixed receiver are used to generate correction data that is communicated to a mobile receiver. Typically, a roving receiver (or simply "rover") receives the correction data from a reference source or base station that already knows its exact location, in addition to receiving signals from GNSS satellites. To generate the correction data, the base station first tracks all the satellites in view and measures their pseudoranges. Next, the base station computes its position and compares the computed position to its known position to generate a list of corrections needed to make the measured pseudorange values accurate for all visible satellites. The correction data is then communicated to the rover. The rover applies these corrections to its computed pseudoranges to produce a more accurate position.

Another improvement to GNSS accuracy came through the use of real-time kinematic (RTK) measurement techniques, in which the rover determines its position relative to the base station by measuring the phase of the carrier wave. The carrier signal has a much shorter wavelength than the width of a PRN code (a hundred to a thousand times shorter), therefore allowing the ability to measure distance to improve proportionally. RTK networks offer several advantages to users, including (1) fast, centimeter-level positioning anywhere over a large area, (2) a common coordinate reference frame, and (3) elimination of the need to set up a private base station for a project.

BRIEF SUMMARY OF THE INVENTION

One general aspect includes a method of processing satellite signals for computing a geospatial position, the method including: receiving a plurality of GNSS signals from a plurality of GNSS satellites. The method of processing satellite signals also includes capturing an image using an imaging device at least partially oriented toward the plurality of GNSS satellites. The method of processing satellite signals also includes segmenting the image into a plurality of regions based on RF characteristics of objects in the image. The method of processing satellite signals also includes determining an orientation of the image. The method of processing satellite signals also includes projecting the plurality of GNSS satellites onto the image based on the orientation of the image such that a corresponding region is identified for each of the plurality of GNSS satellites. The method of processing satellite signals also includes processing each of the plurality of GNSS signals in accordance with the corresponding region for a corresponding GNSS satellite of the plurality of GNSS satellites. Other embodiments of this aspect include corresponding computer systems, apparatus, and computer programs recorded on one or more computer storage devices, each configured to perform the actions of the methods.

Implementations may include one or more of the following features. The method where the plurality of GNSS signals are received via a GNSS antenna, and where the GNSS antenna and the imaging device are mounted to an antenna structure. The method where determining the orientation of the image includes: capturing orientation data using an orientation sensor mounted to the antenna structure, where the orientation of the image is determined based on the orientation data. The method where the GNSS antenna is a multi-element antenna, and where the imaging device is positioned within a threshold distance of a phase center of the multi-element antenna. The method where each particular region of the plurality of regions is characterized by an extent to which the plurality of GNSS signals are obstructed by the objects within the particular region. The method where processing each of the plurality of GNSS signals in accordance with the corresponding region for the corresponding GNSS satellite includes: weighting each of the plurality of GNSS signals in accordance with a weight for the corresponding region for the corresponding GNSS satellite. The method further including: computing the geospatial position based on the processed plurality of GNSS signals. The method where projecting the plurality of GNSS satellites onto the image based on the orientation of the image includes determining a pixel location within the image for each of the plurality of GNSS satellites. Implementations of the described techniques may include hardware, a method or process, or computer software on a computer-accessible medium.

One general aspect includes a system for processing satellite signals for computing a geospatial position, the system including: an antenna structure. The system also includes a GNSS antenna mounted to the antenna structure and configured to receive a plurality of GNSS signals from a plurality of GNSS satellites. The system also includes an imaging device mounted to the antenna structure and configured to capture an image while being at least partially oriented toward the plurality of GNSS satellites; and a processor that is communicatively coupled with the GNSS antenna and the imaging device and is configured to perform operations. The method includes segmenting the image into a plurality of regions based on RF characteristics of objects in the image. The method also includes determining an orientation of the image. The method also includes projecting the plurality of GNSS satellites onto the image based on the orientation of the image such that a corresponding region is identified for each of the plurality of GNSS satellites. The method also includes processing each of the plurality of GNSS signals in accordance with the corresponding region for a corresponding GNSS satellite of the plurality of GNSS satellites. Other embodiments of this aspect include corresponding computer systems, apparatus, and computer programs recorded on one or more computer storage devices, each configured to perform the actions of the methods.

Implementations may include one or more of the following features. The system further including: an orientation sensor mounted to the antenna structure and configured to capture orientation data, where the orientation of the image is determined based on the orientation data. The system where the GNSS antenna is a multi-element antenna, and where the imaging device is positioned within a threshold distance of a phase center of the multi-element antenna. The system where each particular region of the plurality of regions is characterized by an extent to which the plurality of GNSS signals are obstructed by the objects within the particular region. The system where processing each of the plurality of GNSS signals in accordance with the corresponding region for the corresponding GNSS satellite includes: weighting each of the plurality of GNSS signals in accordance with a weight for the corresponding region for the corresponding GNSS satellite. The system where the operations further include: computing the geospatial position based on the processed plurality of GNSS signals. The system where projecting the plurality of GNSS satellites onto the image based on the orientation of the image includes determining a pixel location within the image for each of the plurality of GNSS satellites. Implementations of the described techniques may include hardware, a method or process, or computer software on a computer-accessible medium.

BRIEF DESCRIPTION OF THE DRAWINGS

FIG. 5A illustrates an example scheme for computing an orientation of an image.

FIG. 5B illustrates an example scheme for computing an orientation of an image.

FIG. 5C illustrates an example scheme for computing an orientation of an image.

DETAILED DESCRIPTION OF THE INVENTION

Figure 1:
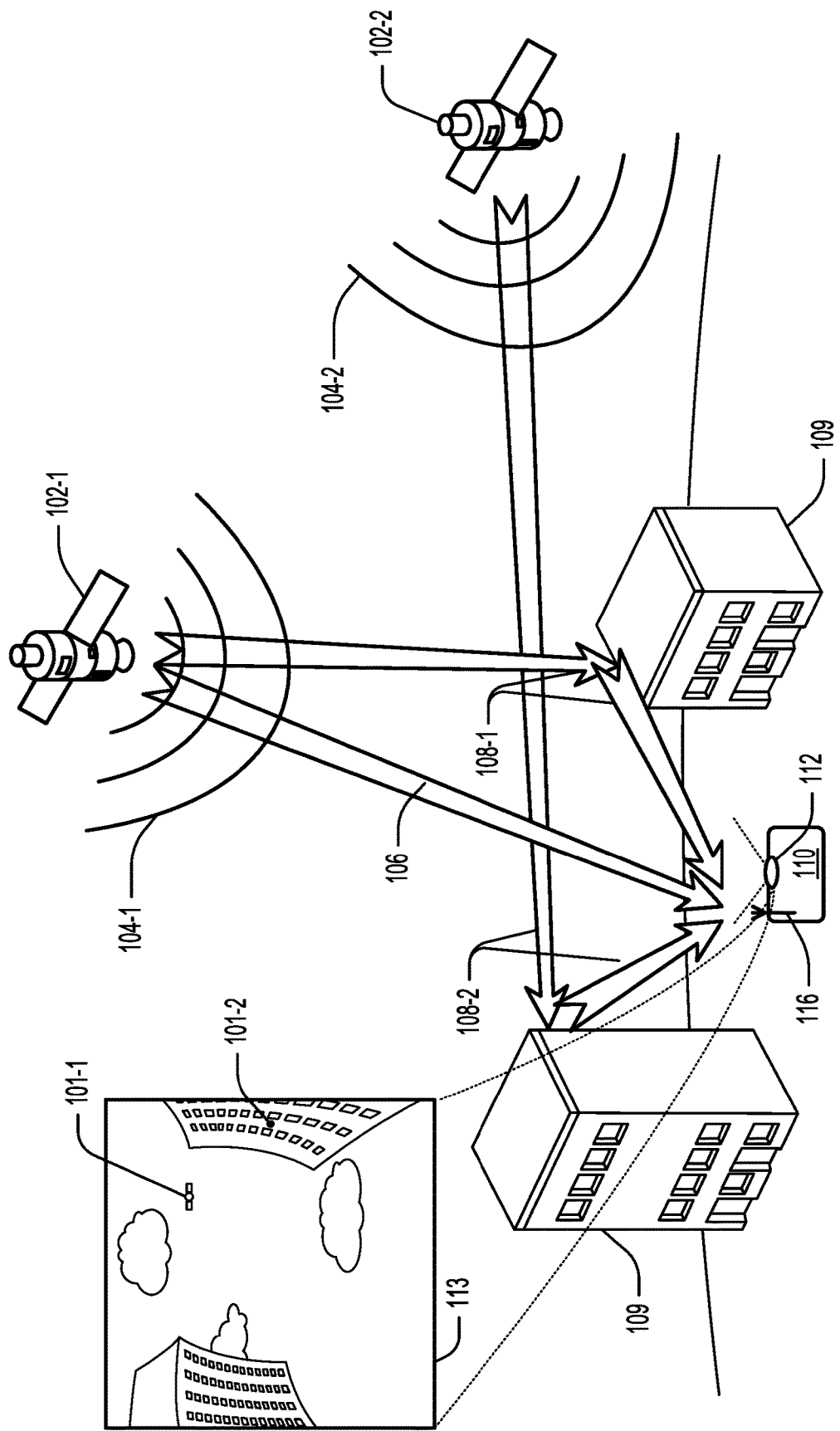
FIG. 1 illustrates an example GNSS receiver operating in an environment with multipath interference.

A significant source of inaccuracy for global navigation satellite systems (GNSS)-based computations is multipath interference, which is caused by wireless signals reflecting off objects while on their way to the GNSS receiver. Such objects may include mountains, trees, buildings, ground, water, persons, etc. A reflected signal, also referred to as a multipath signal, arrives at the GNSS receiver later than a line-of-sight (LOS) signal since it has to travel over a greater distance. While reflected signals with large time delays can be filtered out, reflected signals with shorter delays often distort the correlation function shape used for time delay estimation. If reflected signals are strong enough in comparison to the LOS signals, the reflected signals can confuse the GNSS receiver and cause erroneous measurements.

Embodiments described herein reduce the effects of multipath interference by selectively processing received GNSS signals using images captured near the GNSS receiver of the vertical hemisphere. Each GNSS signal that is received can be processed differently based on where in the image the corresponding GNSS satellite is located. For example, using the GNSS satellite location on the image, it can be determined whether there is a direct visible LOS to the satellite or if it is blocked by an object. This can be accomplished by projecting the orbital positions of the satellites onto the image and determining whether a radio frequency (RF)-blocking object is aligned with the projection. Tracking of a blocked satellite indicates that the pseudorange and carrier phase measurements correspond to reflected signals and should either be discarded or deweighted relative to the LOS signals.

In some implementations, the captured image can be segmented into multiple regions based on the predicted RF characteristics of objects in the image, and the orbital positions of the GNSS satellites can be projected onto one of the regions. In one example, the image is segmented into three regions: one region having objects that provide little RF obstruction (e.g., clear sky, clouds), one region having objects that provide some RF obstruction (e.g., vegetation, foliage), and one region having objects that provide significant RF obstruction (e.g., buildings, mountains). The segmentation can be performed using a machine-learning model, such as a neural network, or using any one of various image segmentation techniques.

Upon receiving a GNSS signal, the GNSS receiver can look up the orbital position of the GNSS satellite that transmitted the signal and project the orbital position onto the captured image. The orbital position may be determined based on the GNSS signal itself (e.g., extracted from the ephemeris data modulated onto the GNSS signal) or may be obtained elsewhere. The pixel location onto which the orbital position is projected is recorded. Next, the pixel location is compared to the segmented regions to determine in which region the pixel location is located. The identified region is associated with the GNSS satellite and the corresponding GNSS signal.

Projecting the orbital positions of the GNSS satellites is facilitated by an accurate measurement of the position and orientation of the imaging device and the corresponding captured image. While determining the position and roll/pitch of the image can be accomplished using various approaches, knowing the heading (also referred to as the azimuth) of the image and/or imaging device is quite difficult if the imaging device is mounted on a vehicle or rod that can spin (e.g., a survey rod or tracked vehicle). Accordingly, some embodiments provide for a combination of a dual-element antenna and an imaging device mounted onto an antenna structure, with the imaging device positioned between the antenna elements near an antenna phase center of the dual-element antenna.

FIG. 1 illustrates an example GNSS receiver 110 operating in an environment with multipath interference, according to some embodiments of the present disclosure. GNSS receiver 110 is operating beneath GNSS satellites 102 which may broadcast wireless signals 104 containing pseudo-random-noise (PRN) codes modulated onto carrier frequencies. Broadcasted wireless signals 104 include both LOS signals 106, i.e., signals transmitted and received without reflection off objects, and reflected signals 108, i.e., signals received by GNSS receiver 110 after reflection off at least one object, such as buildings 109. LOS signals 106 and reflected signals 108 are each received by GNSS receiver 110 via GNSS antenna 116 while GNSS receiver 110 is attempting to compute its geospatial position.

In many instances, GNSS receiver 110 may want to distinguish between LOS signals 106 and reflected signals 108 for the purpose of processing the signals differently for computation of its geospatial position. In some embodiments, this may be accomplished by capturing an image 113 using an image capture device 112 that is at least partially oriented in the upward direction toward GNSS satellites 102. Image 113 may be analyzed and segmented into different regions, and the orbital positions of GNSS satellites 102 may be projected onto image 113. A location 101-1 within image 113 onto which the orbital location of GNSS satellite 102-1 is projected indicates that wireless signals 104-1 at least includes LOS signal 106. Based on the proximity of buildings 109, GNSS receiver 110 may also predict that wireless signals 104-1 further includes reflected signal 108-1. A location 101-2 within image 113 onto which the orbital location of GNSS satellite 102-2 is projected indicates that wireless signals 104-2 does not include a LOS signal but instead includes reflected signal 108-2.

GNSS receiver 110 may accordingly track wireless signals 104-1 while ignoring wireless signals 104-2, since wireless signals 104-2 only includes a reflected signal. In some instances, GNSS receiver 110 may weight wireless signals 104-1 and 104-2 differently while computing its geospatial position. For example, GNSS receiver 110 may process wireless signals 104-1 with a weight value of 1 and wireless signals 104-2 with a weight value of 0.5. GNSS receiver 110 may later modify the weight value associated with wireless signals 104-2 when wireless signals from additional GNSS satellites become available and unobstructed by objects.

Figure 2:
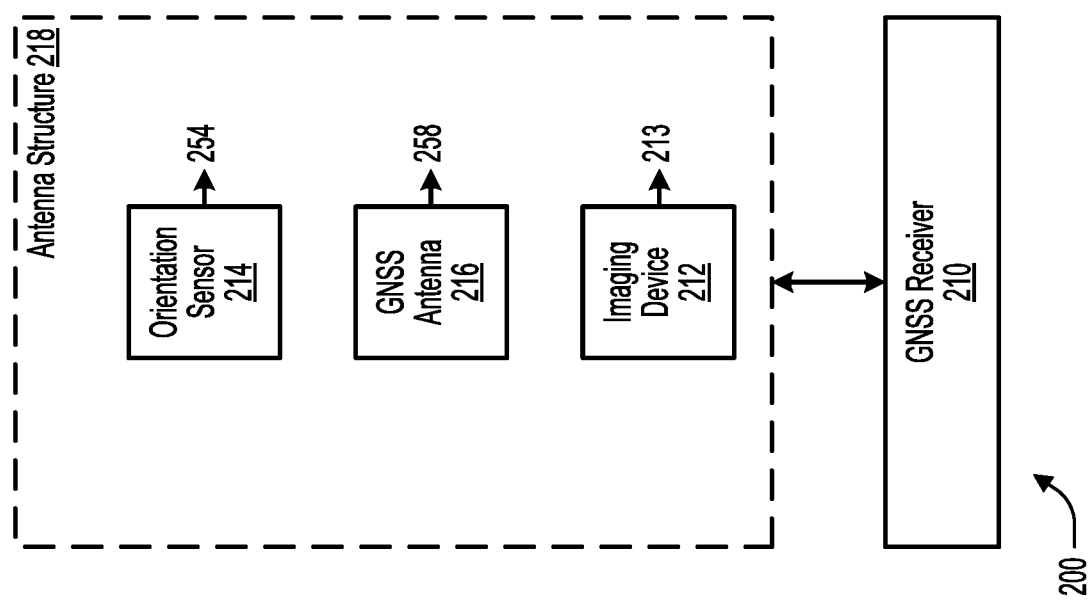
FIG. 2 illustrates an example system for processing satellite signals.

FIG. 2 illustrates an example system 200 for processing satellite signals, according to some embodiments of the present disclosure. In the illustrated example, system 200 includes an orientation sensor 214, a GNSS antenna 216, and an imaging device 212 each mounted to an antenna structure 218. In some embodiments, antenna structure 218 is rigid such that components mounted thereto remain in constant spacing and orientation with respect to each other, allowing the rotational movement of orientation sensor 214 to be indicative of the rotational movement of imaging device 212 and/or GNSS antenna 216. A GNSS receiver 210 is communicatively coupled to each of the components mounted to antenna structure 218 and may receive orientation data 254 from orientation sensor 214, GNSS data 258 from GNSS antenna 216, and an image 213 from imaging device 212.

Figure 3:
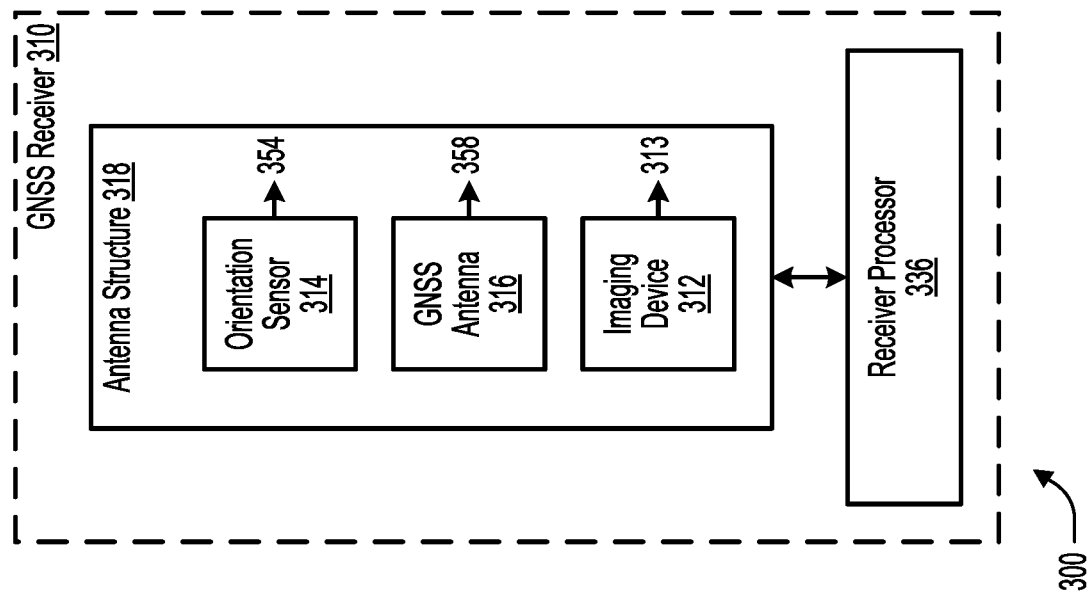
FIG. 3 illustrates an example system for processing satellite signals.

FIG. 3 illustrates an example system 300 for processing satellite signals, according to some embodiments of the present disclosure. In the illustrated example, system 300 includes an orientation sensor 314, a GNSS antenna 316, and an imaging device 312 each mounted to an antenna structure 318 of a GNSS receiver 310. In some embodiments, antenna structure 318 is rigid such that components mounted thereto remain in constant spacing and orientation with respect to each other, allowing the rotational movement of orientation sensor 314 to be indicative of the rotational movement of imaging device 312 and/or GNSS antenna 316. GNSS receiver 310 further includes a receiver processor 336 that is communicatively coupled to each of the components mounted to antenna structure 318. Receiver processor 336 may receive orientation data 354 from orientation sensor 314, GNSS data 358 from GNSS antenna 316, and an image 313 from imaging device 312.

Figure 4A:
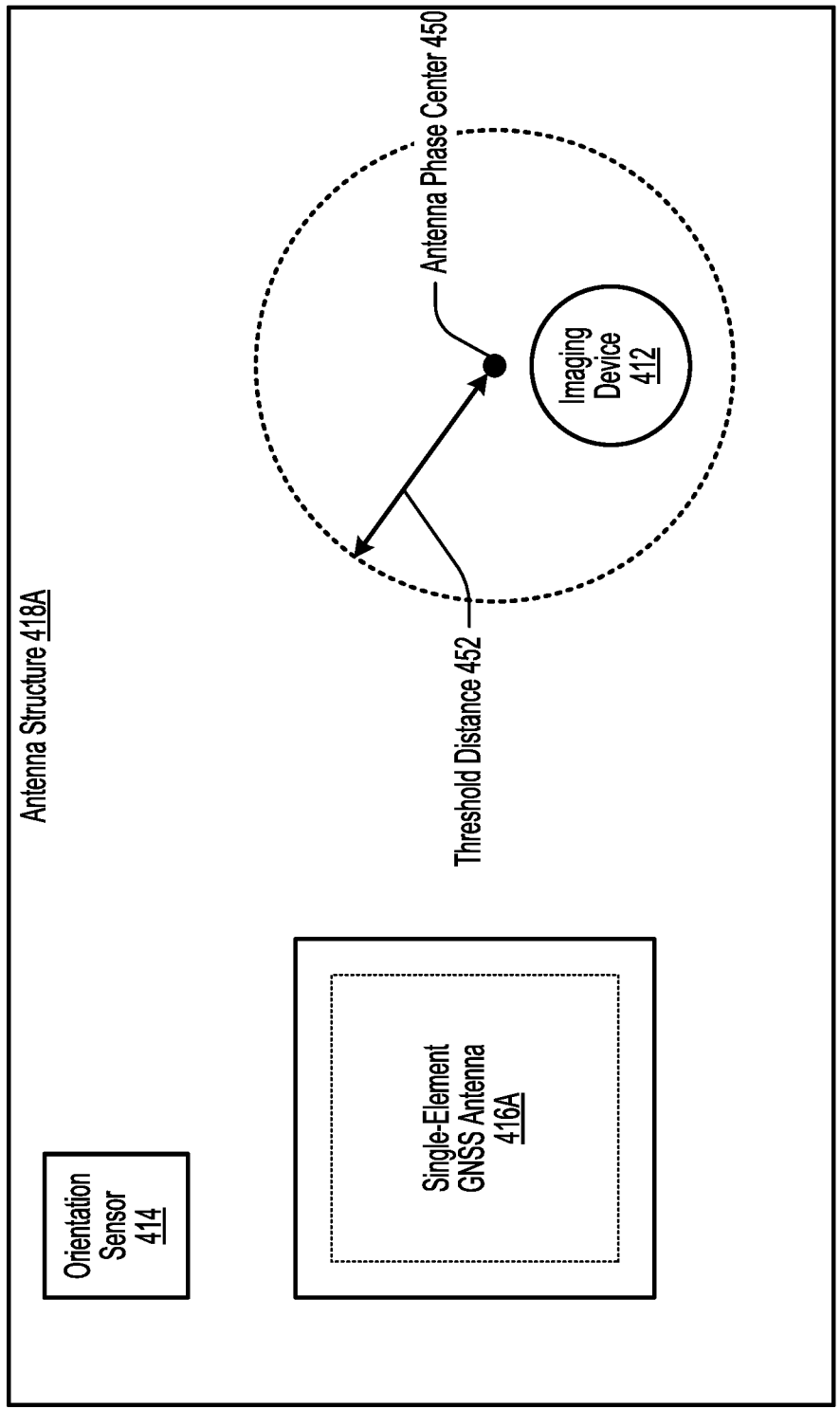
FIG. 4A illustrates an example antenna structure.
Figure 4B:
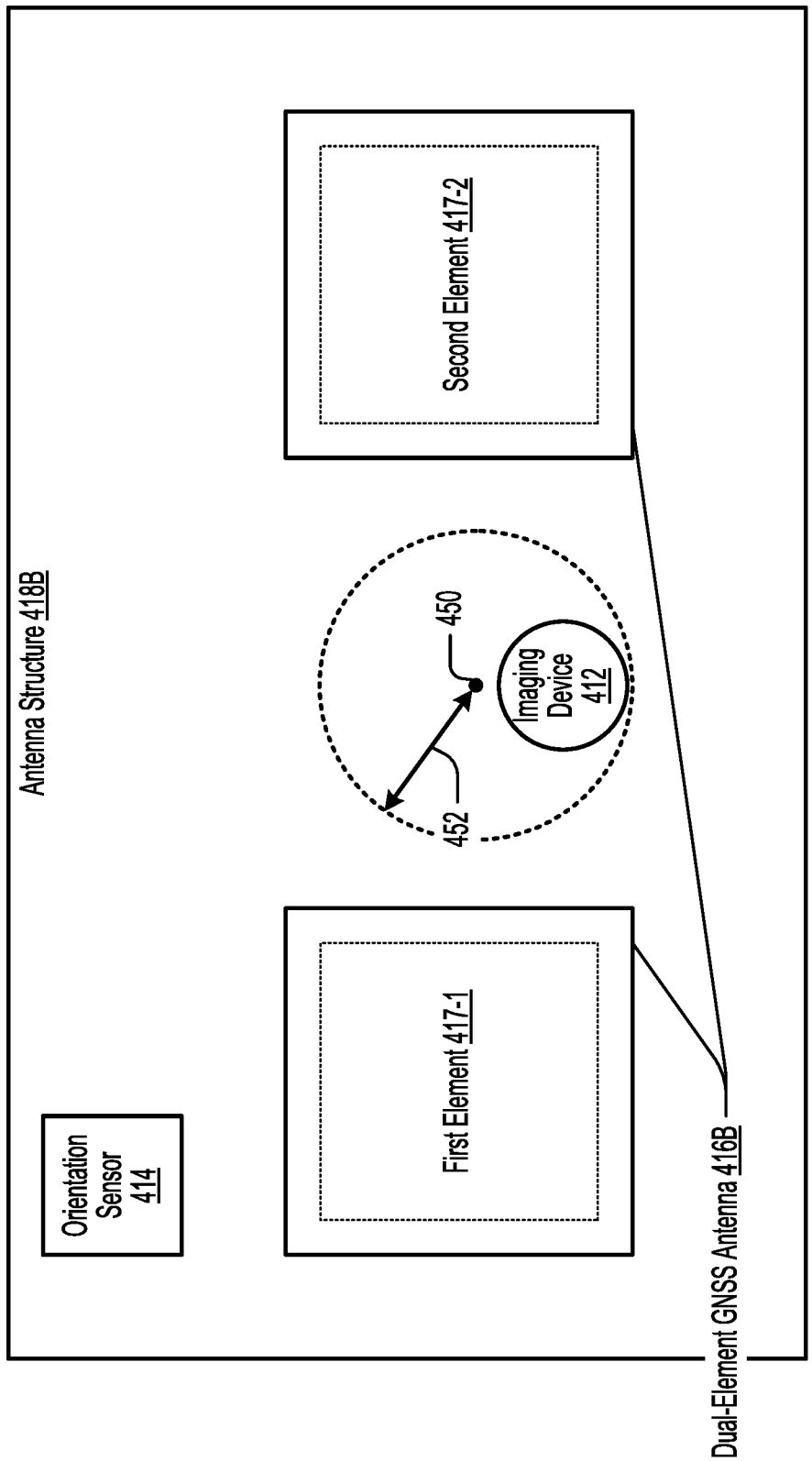
FIG. 4B illustrates an example antenna structure.
Figure 4C:
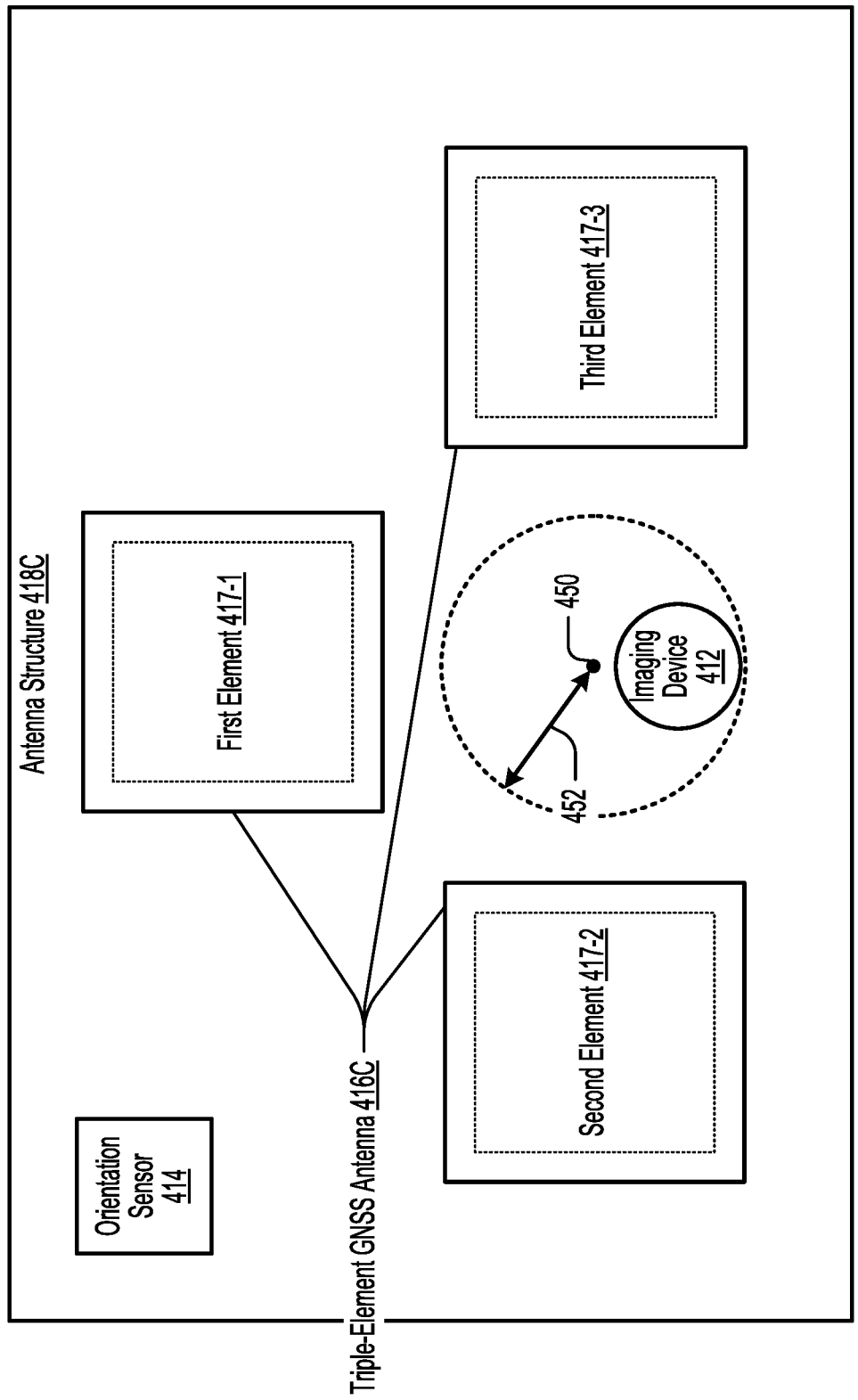
FIG. 4C illustrates an example antenna structure.

FIGS. 4A-4C illustrate example antenna structures 418, according to some embodiments of the present disclosure. Each of the examples illustrated in FIGS. 4A-4C includes an orientation sensor 414, a GNSS antenna 416, and an imaging device 412 each mounted to an antenna structure 418. In the example illustrated in FIG. 4A, a single-element GNSS antenna 416A is mounted to antenna structure 418A and imaging device 412 is mounted near an antenna phase center 450 of single-element GNSS antenna 416A such that imaging device 412 is within a threshold distance 452 of antenna phase center 450. Close positioning between imaging device 412 and antenna phase center 450 enables images captured by imaging device 412 to accurately represent which objects lie between single-element GNSS antenna 416A and the GNSS satellites.

In the example illustrated in FIG. 4B, a dual-element GNSS antenna 416B is mounted to antenna structure 418B and imaging device 412 is mounted within threshold distance 452 of imaging device 412. Dual-element GNSS antenna 416B includes a first element 417-1 and a second element 417-2 each mounted to antenna structure 418B and being horizontally separated. In some embodiments, imaging device 412 may be positioned between elements 417 as shown in the example in FIG. 4B.

In some embodiments, dual-element GNSS antenna 416B may be part of a multiband antenna apparatus such as that disclosed in U.S. Pat. No. 9,778,363, entitled "SATELLITE NAVIGATION USING SIDE BY SIDE ANTENNAS", the disclosure of which is incorporated by reference herein. For example, first element 417-1 may comprise a first antenna configured for reception of GNSS signals in a first multiband of electromagnetic spectrum, and second element 417-2 may comprise a second antenna configured for reception of GNSS signals in a second multiband of electromagnetic spectrum. The first multi-band antenna may include a first (band-1) phase center and the second multi-band antenna may include a second (band-2) phase center.

In some embodiments, a horizontally separated multi-band antenna such as dual-element GNSS antenna 416B offers a way of estimating heading as well as producing multi-frequency measurements. Assuming that the location of each frequency band element can be measured with an instantaneous standard deviation of the position ($\sigma_{position}^2$), the variance of the heading determination will be:

$$\sigma_{heading}^2 = 4\sigma_{position}^2/d^2$$

where d is the separation of the antenna elements. In some instances, the heading determination from the multi-band elements can be integrated with inertial sensors and/or flux-gate compass sensors. True north headings determined from a horizontally separated multi-band antenna system will be unambiguous, but noisy, while flux-gate compass and inertial sensors are biased, but can help to average out noise.

From an antenna design standpoint, the separation of band-1 and band-2 elements dis dependent on the respective signal wavelengths and the dielectric substrate. Sufficient separation is needed to ensure that there isn't cross-coupling between the elements. There is an advantage in minimizing the element spacing d, from an antenna correction standpoint. However, if the elements are spread apart, this increases the angular heading accuracy with which the antenna can be measured. It can also be advantageous to limit the element separation d to less than ½ wavelength in order to ensure that the carrier phase ambiguities determined for combined band-1/band-2 measurements are the same for the separated band-1 and band-2 elements.

The physical packaging of the antenna may also be a constraint for human-transported applications such as hand-held positioning devices such as smart phones or survey equipment. Therefore d will often need to conform to the physical package size of the device on which the antenna elements are mounted. GNSS survey equipment antennas are normally between 10 and 40 cm in diameter, and smart phones have dimensions of (5×15) cm. The angular heading accuracy is therefore limited when dis small.

In the example illustrated in FIG. 4C, a triple-element GNSS antenna 416C is mounted to antenna structure 418C and imaging device 412 is mounted within threshold distance 452 of imaging device 412. Triple-element GNSS antenna 416C includes first element 417-1, second element 417-2, and a third element 417-3 each mounted to antenna structure 418C. In some embodiments, imaging device 412 may be positioned between elements 417 as shown in the example in FIG. 4C.

FIGS. 5A-5C illustrate example schemes for computing an orientation of an image corresponding to the example antenna structures illustrated in FIGS. 4A-4C, according to some embodiments of the present disclosure. In the example illustrated in FIG. 5A, which corresponds to the example shown in FIG. 4A, the orientation of the image is determined based solely on data captured by orientation sensor 514. For example, an orientation sensor 514 may capture orientation data 554, which may be used to determine image orientation 556, while GNSS data 558 received by a single-element GNSS antenna 516A need not be used to determine image orientation 556.

In the example illustrated in FIG. 5B, which corresponds to the example shown in FIG. 4B, the orientation of the image is determined using both data captured by orientation sensor 514 and data received by a dual-element GNSS antenna 516B having first element 517-1 and second element 517-2. For example, orientation sensor 514 may capture orientation data 554, which may be used to determine a partial orientation 560, and GNSS data 558 received by dual-element GNSS antenna 516B may be used to determine a partial orientation 561. Partial orientations 560 and 561 may be used (e.g., combined) to determine image orientation 556. For example, partial orientation 560 may include pitch and roll and partial orientation 561 may include heading.

In the example illustrated in FIG. 5C, which corresponds to the example shown in FIG. 4C, the orientation of the image is determined based solely on data received by a triple-element GNSS antenna 516C having first element 517-1, second element 517-2, and third element 517-3. For example, triple-element GNSS antenna 516C may receive GNSS data 558, which may be used to determine image orientation 556, and thus a dedicated orientation sensor need not be employed.

Figure 6A:
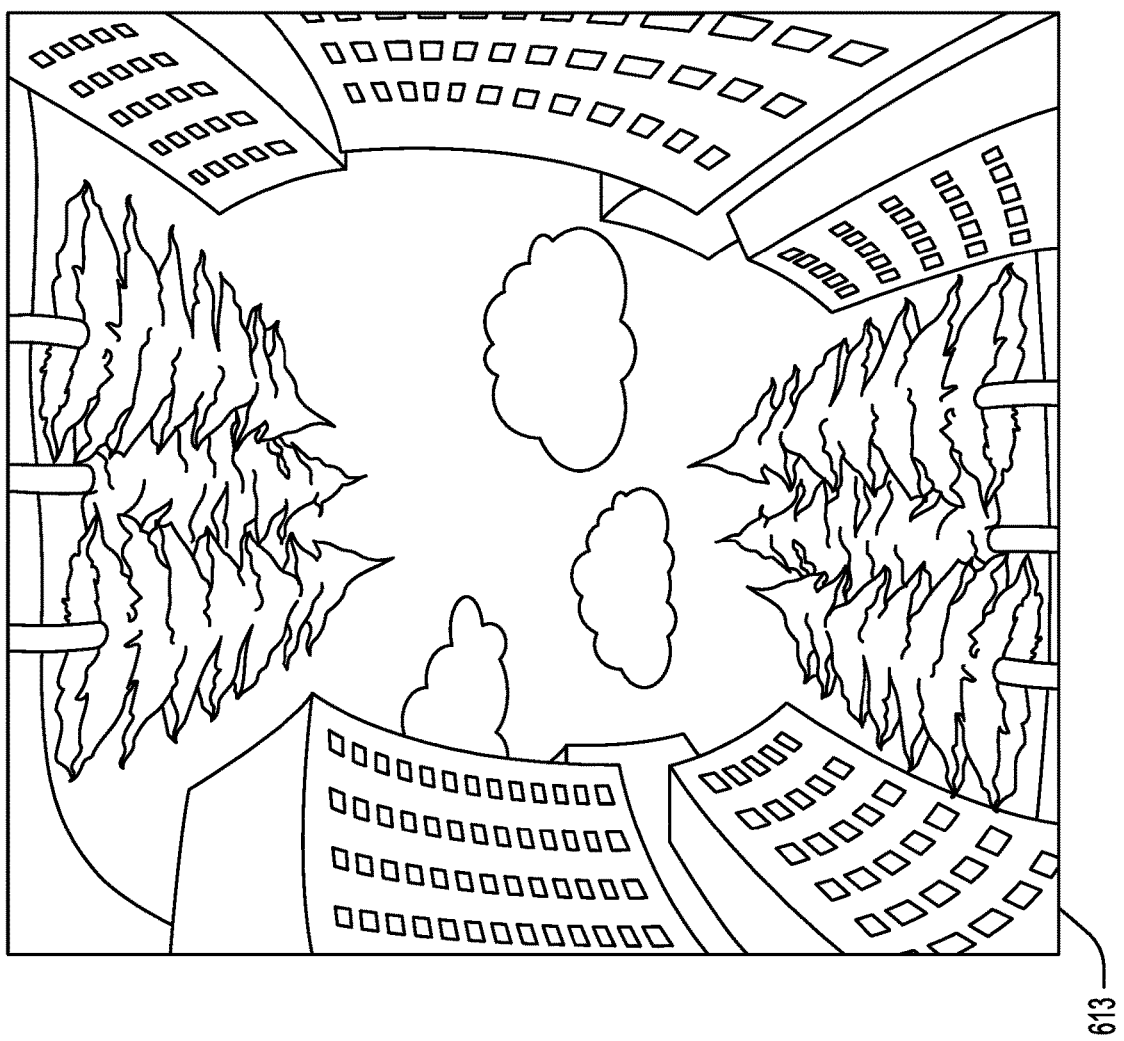
FIG. 6A illustrates an example image captured by an imaging device.

FIG. 6A illustrates an example image 613 captured by an imaging device, according to some embodiments of the present disclosure. Image 613 is upward facing and shows the vertical hemisphere in a setting with buildings, trees, and open sky. In the illustrated example, the imaging device used to capture image 613 includes a wide-angle lens, such as a fisheye lens.

Figure 6B:
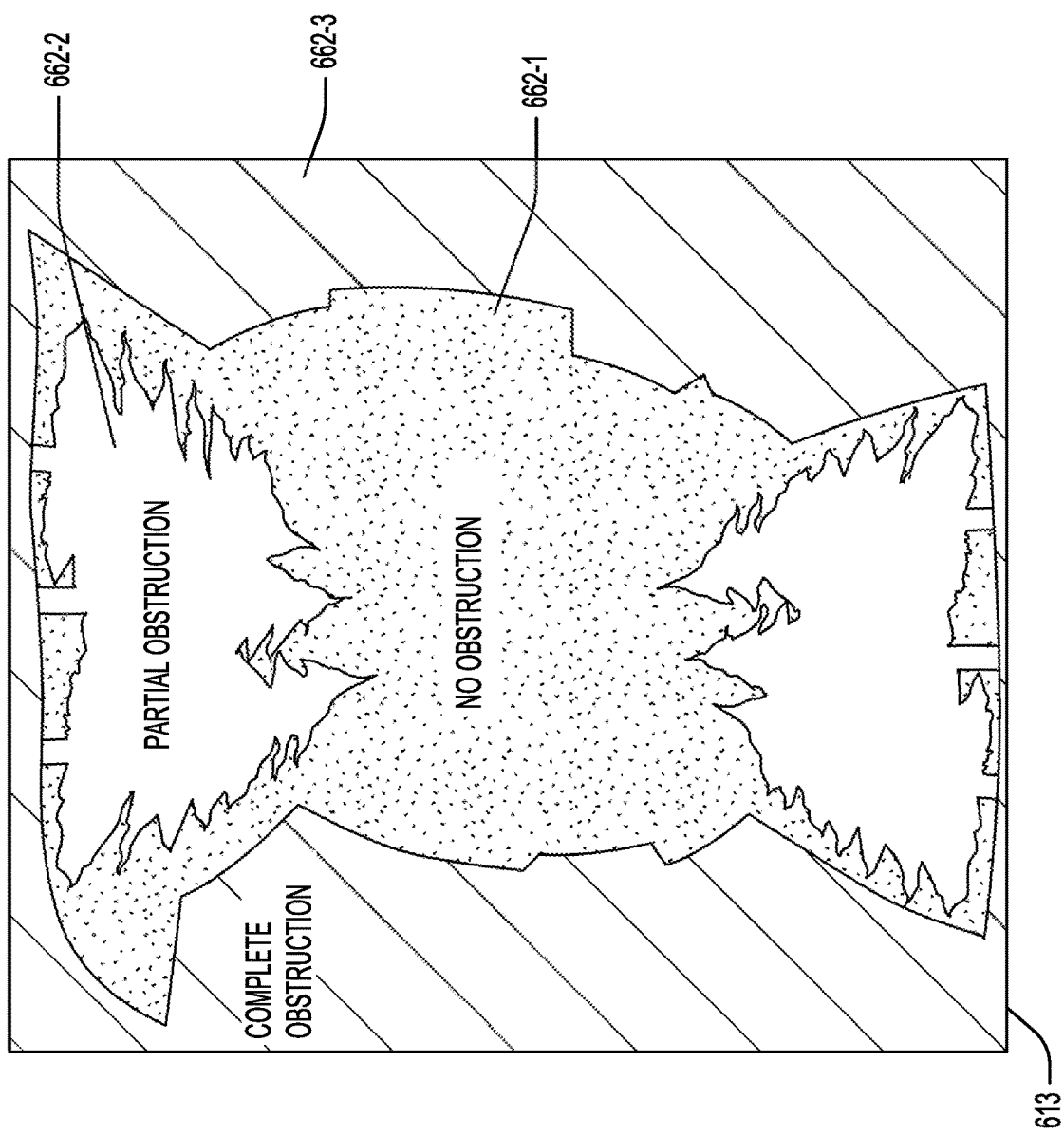
FIG. 6B illustrates an example segmentation of an image into multiple regions.

FIG. 6B illustrates an example segmentation of image 613 into multiple regions 662, according to some embodiments of the present disclosure. Each of regions 662 includes objects with similar RF-blocking characteristics and different regions include objects with dissimilar RF-blocking characteristics. Region 662-1 corresponds to clouds or open sky and includes objects that provide little RF obstruction. Region 662-2 corresponds to vegetation or foliage and includes objects that provide some RF obstruction. Region 662-3 corresponds to buildings and includes objects that provide significant RF obstruction.

Figure 6C:
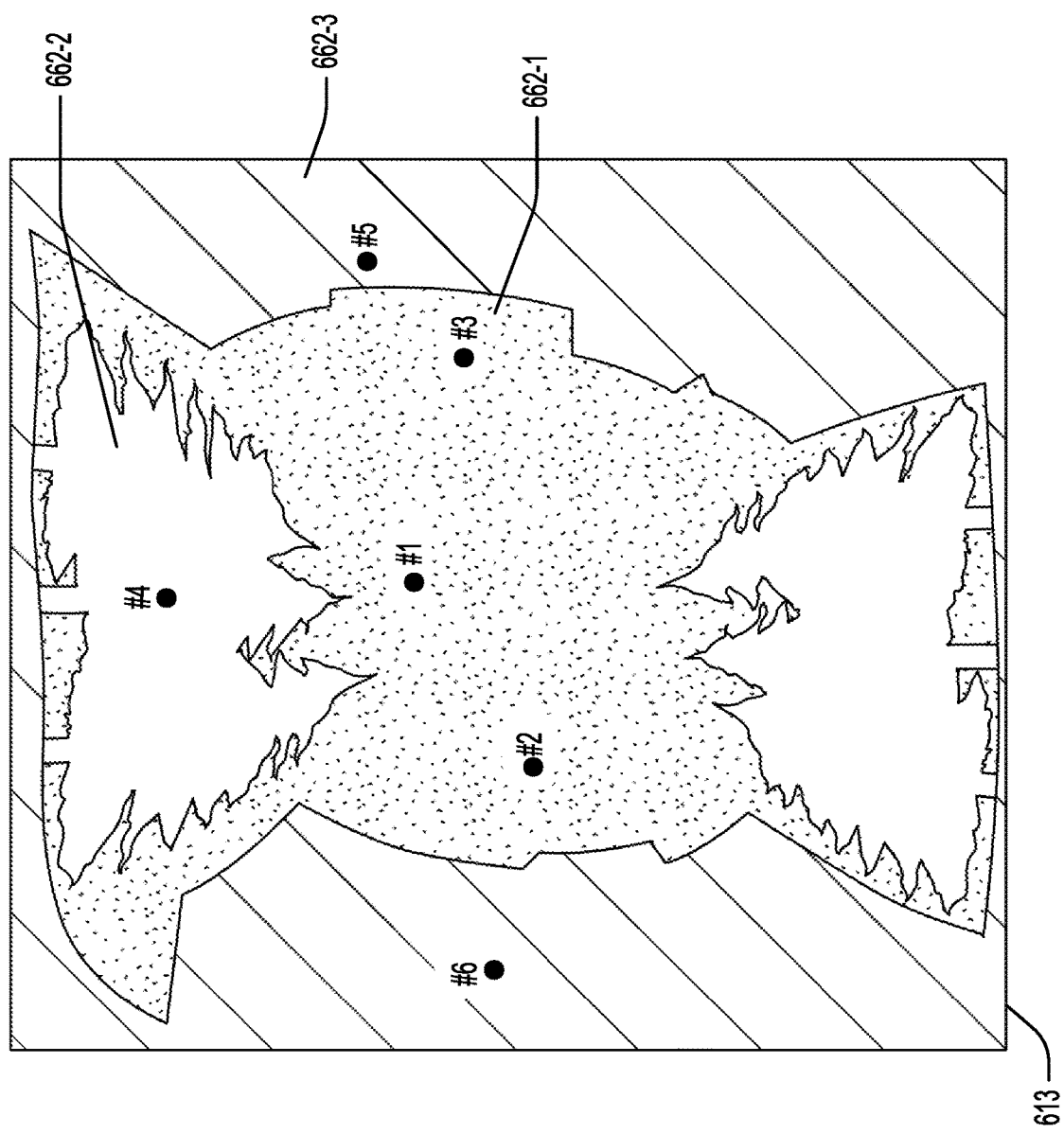
FIG. 6C illustrates an example projection of GNSS satellites onto an image.

FIG. 6C illustrates an example projection of GNSS satellites onto image 613, according to some embodiments of the present disclosure. In the illustrated example, a GNSS receiver receives GNSS signals from satellite #1 (indicated in FIG. 6C as "#1"), determines the orbital position of satellite #1, projects satellite #1 onto image 613 by determining the pixel location for satellite #1 based on the position and orientation of image 613 and the orbital position of satellite #1, and region 662-1 is identified as including the pixel location for satellite #1. Similarly, the GNSS receiver receives GNSS signals from satellite #2, determines the orbital position of satellite #2, projects satellite #2 onto image 613 by determining the pixel location for satellite #2 based on the position and orientation of image 613 and the orbital position of satellite #2, and region 662-1 is identified as including the pixel location for satellite #2. Similar steps are performed for each of satellites #3, #4, #5, and #6, except that region 662-2 is identified as including the pixel location for satellite #4 and region 662-3 is identified as including the pixel locations for satellites #5 and #6.

In some embodiments, the received GNSS signals corresponding to satellites #1, #2, and #3 may be determined to be LOS signals, the received GNSS signals corresponding to satellites #5 and #6 may be determined to be reflected signals, and the received GNSS signals corresponding to satellite #4 may be flagged as possibly being either LOS or reflected. The GNSS signals in the three regions may be processed in accordance with their region. For example, a weight table may provide that pseudoranges computed using GNSS signals in region 662-1 may be weighted by a weight of 1, pseudoranges computed using GNSS signals in region 662-2 may be weighted by a weight of 0.5, and pseudoranges computed using GNSS signals in region 662-3 may be weighted by a weight of 0.

In some embodiments, the weight assigned to a satellite may be modified based on the proximity of the satellite's pixel location to a neighboring region. For example, the weight assigned to satellite #3 may be less than the weight assigned to satellite #1 due to the proximity of the pixel location for satellite #3 to region 662-3. As another example, the weight assigned to satellite #5 may be greater than the weight assigned to satellite #6 due to the proximity of the pixel location for satellite #5 to region 662-1. In some instances, the assigned weight may be increased or decreased linearly as a function of distance from the nearest neighboring region, with some minimum threshold distance from the boundary at which the assigned weight begins to be adjusted, e.g., 10 pixels, 50 pixels, 100 pixels, etc.

In some embodiments, the weight table may be modified based on the number of detected satellites. For example, the weight table may be initialized or set to [1, 1, 1](corresponding to regions 662-1, 662-2, and 662-3, respectively) until a threshold number of satellites (e.g., four or five) is reached. For example, upon receiving GNSS signals from the fourth or fifth satellite, the weight table may be modified from [1, 1, 1] to [1, 0.8, 0.6], thereby deweighting the GNSS signals in regions 662-2 and 662-3. Continuing with the above example, upon receiving GNSS signals from a second threshold number of satellites (e.g., six or seven), the weight table may be modified from [1, 0.8, 0.6] to [1, 0.5, 0], thereby further deweighting the GNSS signals in regions 662-2 and 662-3. Other possibilities of dynamically adjusting the weight table based on the number of detected satellites are contemplated and are considered to be within the scope of the present disclosure.

Figure 7:
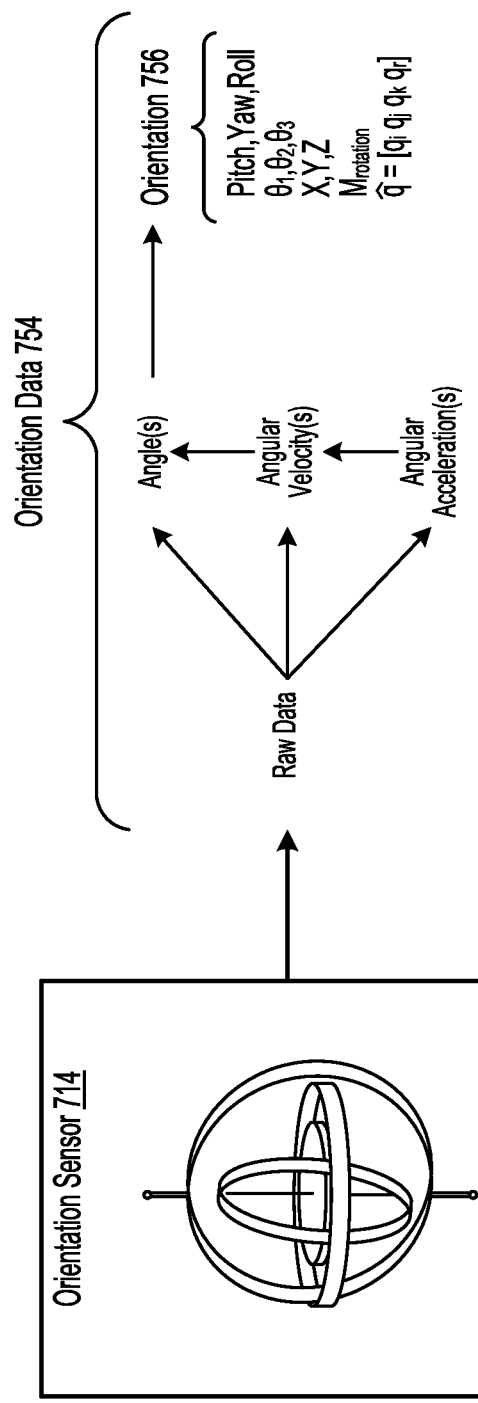
FIG. 7 illustrates an example operation of an orientation sensor.

FIG. 7 illustrates an example operation of an orientation sensor 714, according to some embodiments of the present disclosure. Orientation sensor 714, which may alternatively be referred to as a rotation sensor or an angle sensor, may correspond to any sensor that captures data that is used to determine all or part of a geometric orientation (or attitude) of orientation sensor 714 or of a different target component having similar rotational movement as orientation sensor 714. Orientation data 754 may correspond to such data and orientation 756 may be the corresponding geometric orientation.

Orientation 756 may be expressed in a variety of manners. While rotation is generally described by three real parameters, there exist a variety of representations in which fewer or greater than three parameters are employed. For example, orientation 756 may be expressed by one or more of: a 3×3 rotation matrix, a Euler axis and angle (unit vector and angle), Euler rotations, quaternions, pitch/yaw/roll, heading/pitch/roll (attitude), among other possibilities.

Orientation sensor 714 may include one or more of: an inertial measurement unit (IMU), a gyroscope, a tilt sensor (e.g., MEMS, liquid capacitive, electrolytic), an inclinometer, a force balance sensor, an accelerometer, a magnetometer, among other possibilities. Orientation data 754 may include one or more angles, one or more angular velocities, one or more angular accelerations, or the raw data used for their computation. In some embodiments, one type of data may be converted into another type of data by integrating or computing a derivative. In one example, orientation sensor 714 may be a gyroscope that captures orientation data 754 in the form of angular velocities which may be integrated to compute angles that are used as orientation 756. In another example, orientation 714 may be an electrolytic tilt sensor that captures orientation data 754 in the form of output voltages (raw data) that are converted into angles that are used as orientation 756.

Figure 8A:
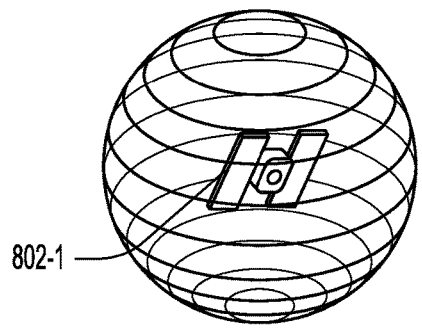
FIG. 8A illustrates a step of an example trilateration technique.
Figure 8B:
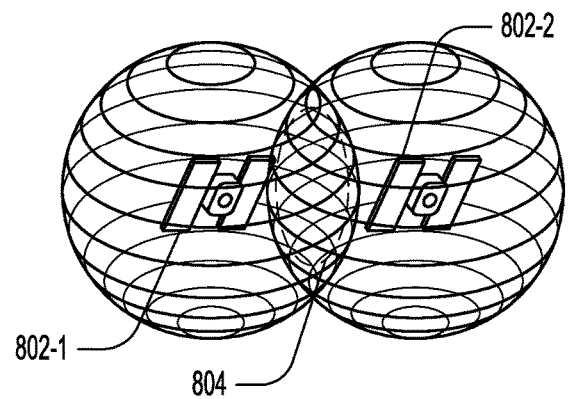
FIG. 8B illustrates a step of an example trilateration technique.

FIGS. 8A-8D illustrate an example trilateration technique performed by a GNSS receiver operating within a GNSS to generate a position estimate, according to some embodiments of the present disclosure. FIG. 8A shows a first scenario in which a GNSS receiver receives GNSS signals from a first satellite 802-1 and generates a distance estimate (e.g., 20,200 km) for that satellite. This informs the GNSS receiver that it is located somewhere on the surface of a sphere with a radius of 20,200 km, centered on first satellite 802-1. FIG. 8B shows a second scenario in which the GNSS receiver receives GNSS signals from a second satellite 802-2 and generates a distance estimate (e.g., 23,000 km) for the additional satellite. This informs the GNSS receiver that it is also located somewhere on the surface of a sphere with a radius of 23,000 km, centered on second satellite 802-2. This limits the possible locations to somewhere on the region 804 where the first sphere and second sphere intersect.

Figure 8C:
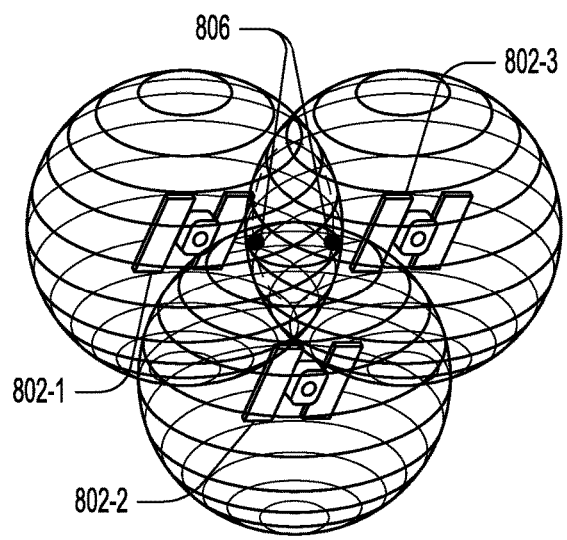
FIG. 8C illustrates a step of an example trilateration technique.
Figure 8D:
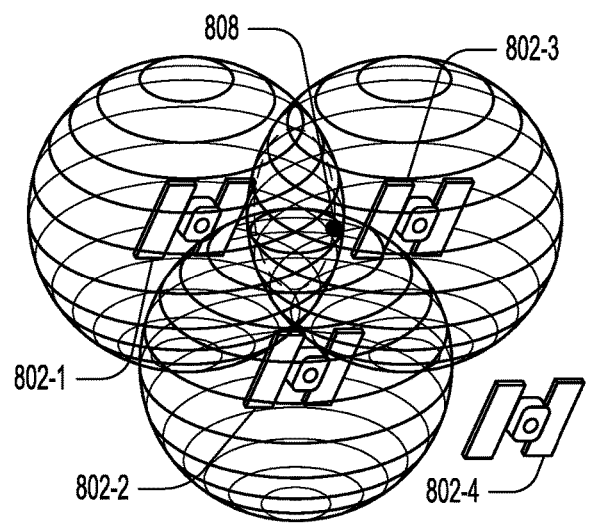
FIG. 8D illustrates a step of an example trilateration technique.

FIG. 8C shows a third scenario in which the GNSS receiver receives GNSS signals from a third satellite 802-3 and generates a distance estimate (e.g., 25,800 km) for the additional satellite. This informs the GNSS receiver that it is also located somewhere on the surface of a sphere with a radius of 25,800 km, centered on third satellite 802-3. This limits the possible locations to two points 806 where first sphere 802-1, second sphere 802-2, and third sphere 802-3 intersect. FIG. 8D shows a fourth scenario in which the GNSS receiver receives GNSS signals from a fourth satellite 802-4. Fourth satellite 802-4 can be used to resolve which of points 806 is a correct point 808 (by generating a fourth sphere) and/or to synchronize the receiver's clock with the satellites' time.

Figure 9:
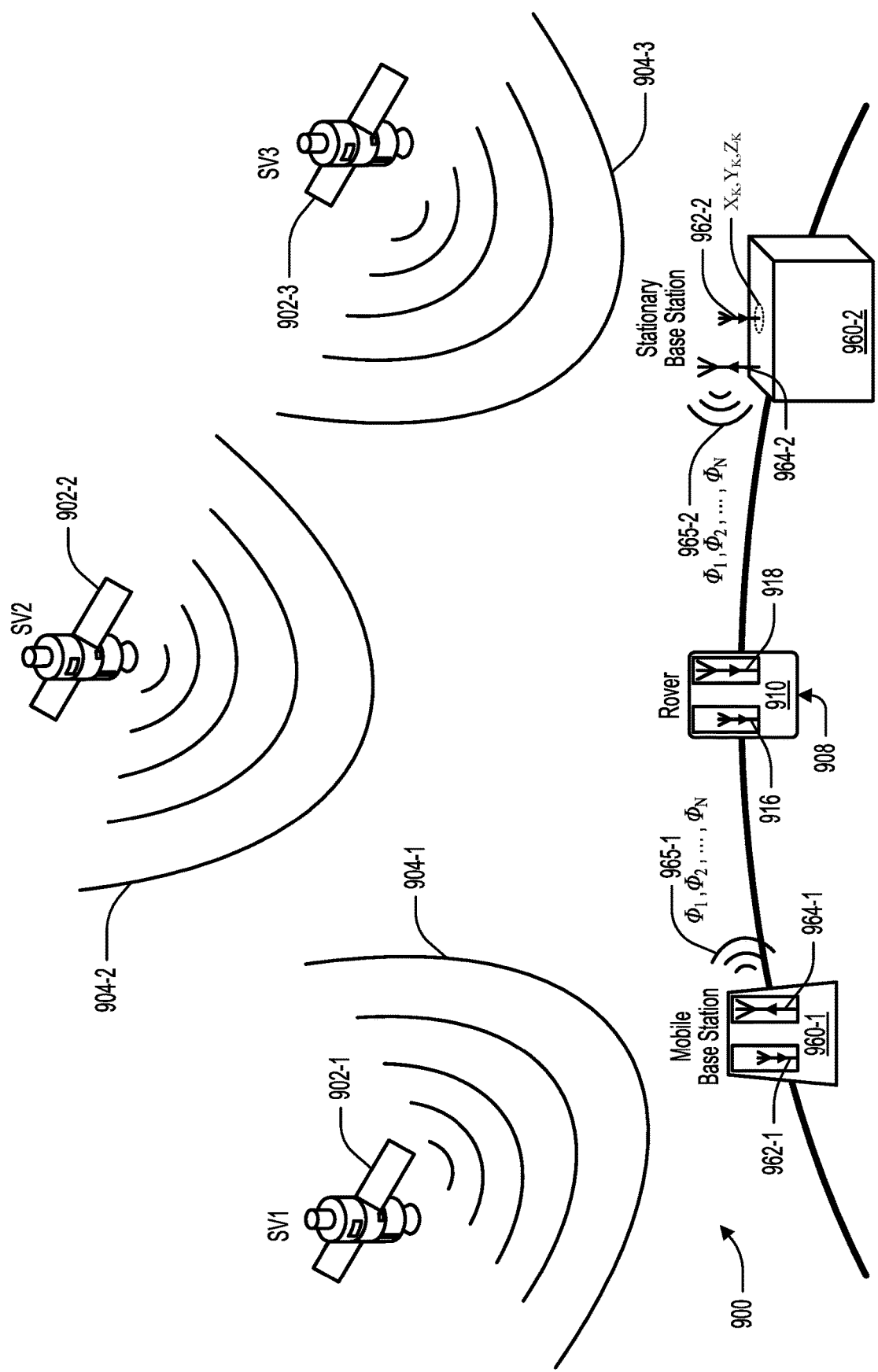
FIG. 9 illustrates an example of a rover, a mobile base station, and a stationary base station operating within a GNSS.

FIG. 9 illustrates an example of a rover 908 (containing a GNSS receiver 910), a mobile base station 960-1, and a stationary base station 960-2 operating within a GNSS 900, according to some embodiments of the present disclosure. GNSS 900 includes one or more GNSS satellites 902, i.e., space vehicles (SV), in orbit above rover 908 and base stations 960. GNSS satellites 902 may continuously, periodically, or intermittently broadcast wireless signals 904 containing PRN codes modulated onto carrier frequencies (e.g., L1 and/or L2 carrier frequencies). In many cases, wireless signals 904 corresponding to different GNSS satellites 902 may include different PRN codes that identify a particular GNSS satellite 902 such that receivers may associate different pseudoranges to different GNSS satellites 902. For example, GNSS satellite 902-1 may broadcast wireless signals 904-1 which contain a different PRN code than the PRN code contained in wireless signals 904-2 broadcasted by GNSS satellite 902-2.

Similarly, GNSS satellite 902-3 may broadcast wireless signals 904-3 which contain a different PRN code than the PRN codes contained in wireless signals 904-1 and 904-2 broadcasted by GNSS satellites 902-1 and 902-2, respectively. One or more of wireless signals 904 may be received by a GNSS antenna 916 of GNSS receiver 910. GNSS antenna 916 may be a patch antenna, a turnstile antenna, a helical antenna, a parabolic antenna, a phased-array antenna, a resistive plane antenna, a choke ring antenna, a radome antenna, among other possibilities.

Each of GNSS satellites 902 may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo E5A, etc.). For example, GNSS satellite 902-1 may be a GPS satellite and may transmit wireless signals having a GPS L1 C/A signal type (i.e., wireless signals having frequencies within the GPS L1 band and having been modulated using C/A code). GNSS satellite 902-1 may additionally or alternatively transmit wireless signals having a GPS L2C signal type (i.e., wireless signals having frequencies within the GPS L2 band and having been modulated using L2 civil codes). In some embodiments, GNSS satellite 902-1 may additionally be a Galileo satellite and may transmit wireless signals having a Galileo signal type (e.g., Galileo E1). Accordingly, a single satellite may include the ability to transmit wireless signals of a variety of signal types.

GNSS receiver 910 may use the pseudoranges between itself and GNSS satellites 902-1, 902-2, and 902-3 to generate a position estimate through trilateration as described in reference to FIGS. 8A-8D. For example, multiple spheres may be generated having center locations corresponding to the locations of GNSS satellites 902 and radii corresponding to the pseudoranges, with the intersection point(s) of the spheres used to determine the position estimate for GNSS receiver 910. The position estimate may be continuously, periodically, or intermittently updated by generating new pseudoranges and performing trilateration using the new pseudoranges. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

Mobile base station 960-1 and stationary base station 960-2 may include GNSS antennas 962-1 and 962-2, respectively, where GNSS antenna 962-2 is positioned at a known position (e.g., $X_K, Y_K, Z_K$). Mobile base station 960-1 may be movable such that multiple mobile base stations 960-1 may be brought within or surrounding a project site so as to provide high-accuracy position estimates. Each of GNSS antennas 962 may be similar to GNSS antenna 916 and may be configured to receive one or more of wireless signals 904. For example, each of GNSS antennas 962 may be a patch antenna, a turnstile antenna, a helical antenna, a parabolic antenna, a phased-array antenna, a resistive plane antenna, a choke ring antenna, a radome antenna, among other possibilities.

Each of base stations 960 may send a correction signal 965 containing correction data to GNSS receiver 910. The correction data is used by GNSS receiver 910 to improve the accuracy of its position estimate. In some embodiments, the correction data includes a plurality of carrier phases $\Phi_1, \Phi_2, \ldots, \Phi_N$, where N is the number of GNSS satellites. In some embodiments, the correction data includes a 3D offset amount (e.g., $X_C, Y_C, Z_C$) for modifying the position estimate of GNSS receiver 910. In one example, position estimates of stationary base station 960-2 made using GNSS antenna 962-2 are compared to the known position and the correction data may be generated based on the comparison. In some embodiments, the correction data includes any one of various types of raw or processed satellite data.

Correction signals 965 containing the correction data may be wirelessly transmitted by base stations 960 using correction antennas 964 and may be received by GNSS receiver 910 using a correction antenna 918. The correction signals 965 may be transmitted continuously, periodically, or intermittently by base stations 960. In some embodiments, correction signals 965 are transmitted over a set of wireless frequencies outside the GNSS frequencies (e.g., lower than the GNSS frequencies). In some embodiments, correction antennas 964 may be used for transmission only and correction antenna 918 may be used for reception only, although in some embodiments additional handshaking between GNSS receiver 910 and base stations 960 may occur.

Figure 10:
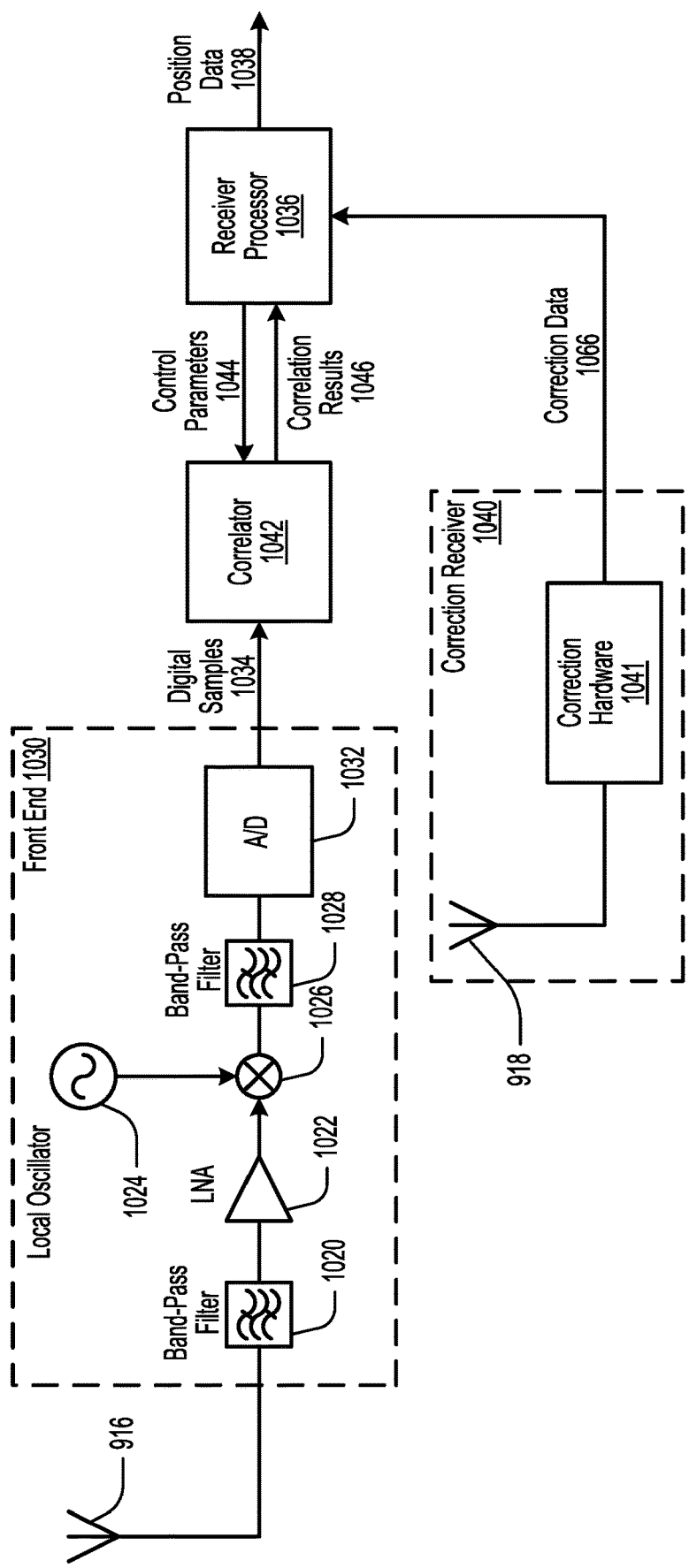
FIG. 10 illustrates an example block diagram of a GNSS receiver.

FIG. 10 illustrates an example block diagram of GNSS receiver 910, according to some embodiments of the present disclosure. GNSS receiver 910 includes antenna 916 for receiving wireless signals 904 and sending/routing wireless signals 904 to a RF front end 1030. RF front ends are well known in the art, and in some instances include a band-pass filter 1020 for initially filtering out undesirable frequency components outside the frequencies of interest, a low-noise amplifier (LNA) 1022 for amplifying the received signal, a local oscillator 1024 and a mixer 1026 for down converting the received signal from RF to intermediate frequencies (IF), a band-pass filter 1028 for removing frequency components outside IF, and an analog-to-digital (A/D) converter 1032 for sampling the received signal to generate digital samples 1034.

In some instances, RF front end 1030 includes additional or fewer components than that shown in FIG. 10. For example, RF front end 1030 may include a second local oscillator (90 degrees out of phase with respect to the first), a second mixer, a second band-pass filter, and a second A/D converter for generating digital samples corresponding to the quadrature component of wireless signals 904. Digital samples corresponding to the in-phase component of wireless signals 904 and digital samples corresponding to the quadrature component of wireless signals 904 may both be sent to a correlator 1042. In some embodiments, digital samples corresponding to both in-phase and quadrature components may be included in digital samples 1034.

Other components within RF front end 1030 may include a phase-locked loop (PLL) for synchronizing the phase of local oscillator 1024 with the phase of the received signal, and a phase shifter for generating a second mixing signal using local oscillator 1024 that is 90 degrees out of phase with local oscillator 1024. In some embodiments, RF front end 1030 does not include band-pass filter 1020 and LNA 1022. In some embodiments, A/D converter 1032 is coupled directly to antenna 916 and samples the RF signal directly without down-conversion to IF. In some embodiments, RF front end 1030 only includes band-pass filter 1020 and A/D converter 1032. Other possible configurations of RF front end 1030 are possible.

Digital samples 1034 generated by RF front end 1030 may be sent to a correlator 1042, which may perform one or more correlations on digital samples 1034 using local codes. Operation of correlator 1042 may be controlled by control parameters 1044 generated by a receiver processor 1036. Correlator 1042 may generate correlation results 1046 based on digital samples 1034 and control parameters 1044 and send these results to receiver processor 1036. In some embodiments, one or more operations performed by correlator 1042 may alternatively be performed by receiver processor 1036. In some embodiments, correlator 1042 is a specific piece of hardware, such as an application-specific integrated circuit (ASIC) or a field-programmable gate array (FPGA). In some embodiments, operations performed by correlator 1042 are performed entirely in software using digital signal processing (DSP) techniques.

Based on multiple pseudoranges corresponding to multiple GNSS satellites 902, as well as correction data 1066 generated by a correction receiver 1040 having correction hardware 1041, receiver processor 1036 may generate and output position data 1038 comprising a plurality of GNSS points. Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 1038 may be outputted to be displayed to a user, transmitted to a separate device (e.g., computer, smartphone, server, etc.) via a wired or wireless connection, or further processed, among other possibilities.

Figure 11:
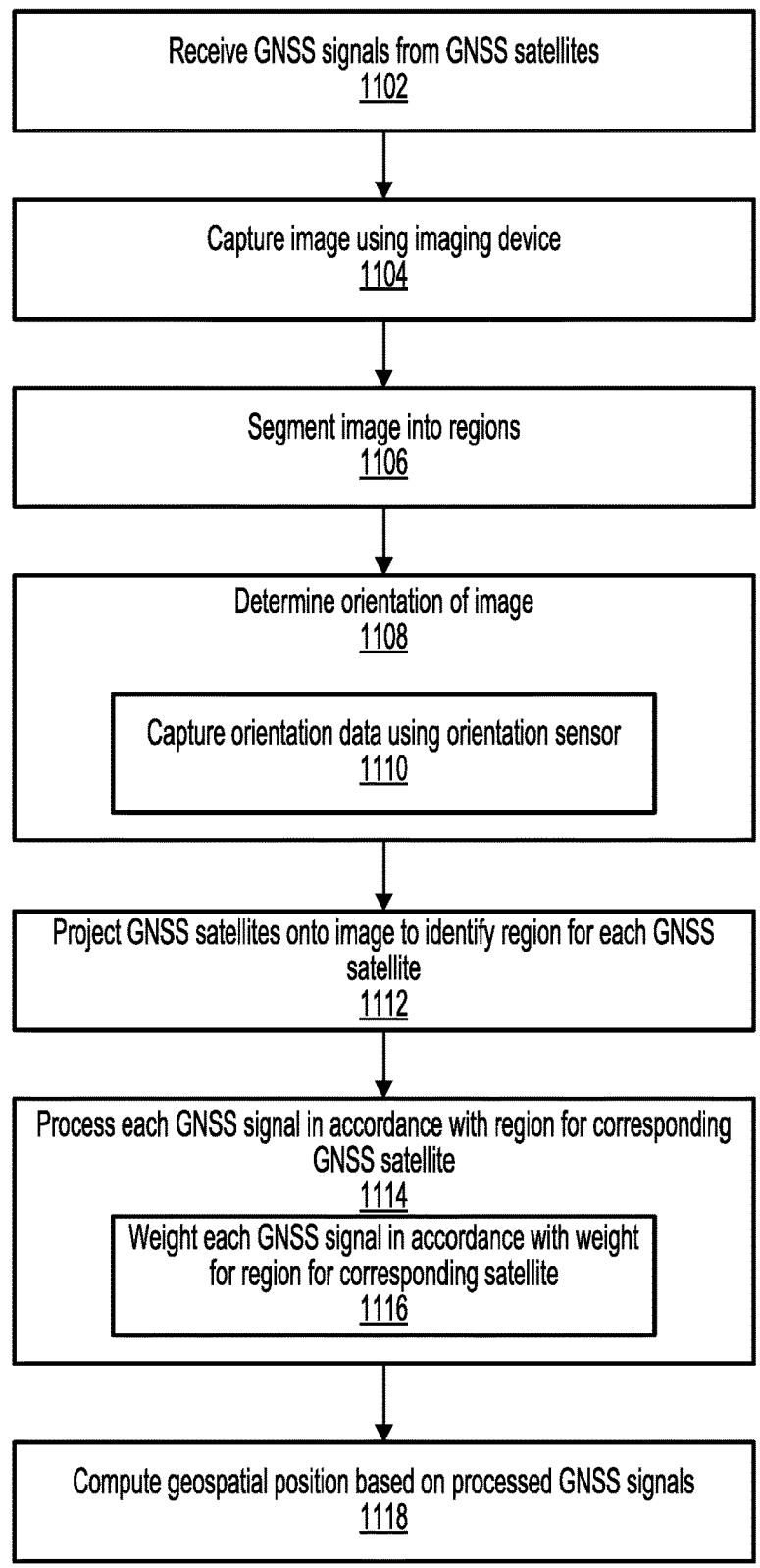
FIG. 11 illustrates a method for processing satellite signals for computing a geospatial position.

FIG. 11 illustrates a method 1100 for processing satellite signals for computing a geospatial position, according to some embodiments of the present disclosure. One or more steps of method 1100 may be omitted during performance of method 1100, and steps of method 1100 need not be performed in the order shown. One or more steps of method 1100 may be performed by one or more processors, such as those included in a receiver processor (e.g., receiver processors 336, 1036) and/or a GNSS receiver (e.g., GNSS receivers 110, 210, 310, 910). The geospatial position may be the geospatial position of a system that (at least partially) performs method 1100 or any component thereof (e.g., GNSS receiver, GNSS antenna). In some instances, the geospatial position may correspond to an antenna phase center of one or more antennas of the system that (at least partially) perform method 1100.

Method 1100 may be implemented as a computer-readable medium or computer program product comprising instructions which, when the program is executed by one or more computers, cause the one or more computers to carry out the steps of method 1100. Such computer program products can be transmitted, over a wired or wireless network, in a data carrier signal carrying the computer program product.

At step 1102, a plurality of GNSS signals (e.g., wireless signals 104, 904) are received from a plurality of GNSS satellites (e.g., GNSS satellites 102, 802, 902). Each of the plurality of GNSS signals may be received from one of the plurality of GNSS satellites. The plurality of GNSS satellites may transmit the plurality of GNSS signals from medium Earth orbit (MEO). One or more of the plurality of GNSS satellites may be GPS satellites or may operate within any of various GNSS systems.

The plurality of GNSS signals are received via a GNSS antenna (e.g., GNSS antennas 116, 216, 316, 416, 516, 916). The GNSS antenna may be mounted to an antenna structure (e.g., antenna structure 218, 318, 418). The antenna structure may be rigid such that components mounted to the antenna structure remain in constant spacing and orientation with respect to each other. The GNSS antenna may be a multi-element GNSS antenna and may include a plurality of elements (e.g., elements 417, 517).

At step 1104, an image (e.g., images 113, 213, 313, 613) is captured using an imaging device (e.g., imaging devices 112, 212, 312, 412). The imaging device may be mounted to the antenna structure. The imaging device may be at least partially orientated toward the plurality of GNSS satellites. For example, the imaging device may be an upward-facing camera. In some embodiments, the imaging device may be a fisheye lens camera. In some embodiments, the image may be captured using multiple imaging devices that each capture an image which are combined to create a composite image. In some embodiments, the imaging device may be mounted to the antenna structure such that the imaging device is positioned within a threshold distance (e.g., threshold distance 452) of a phase center (e.g., antenna phase center 450) of the GNSS antenna.

At step 1106, the image is segmented into a plurality of regions (e.g., regions 662) based on RF characteristics of objects in the image. Each region of the plurality of regions may be characterized by an extent to which the plurality of GNSS signals are obstructed by the objects within the region. In one example, the plurality of regions includes a first region having objects that provide little obstruction to satellite signals passing therethrough (e.g., clear sky, clouds), a second region having objects that provide some obstruction to satellite signals passing therethrough (e.g., vegetation, foliage), and a third region having objects that provide significant obstruction to satellite signals passing therethrough (e.g., buildings, mountains).

In some embodiments, the image may be segmented such that each pixel of the image is included in one of the plurality of regions. In some embodiments, certain portions of the image may not be included in any of the plurality of regions. As an example, the process that performs image segmentation may be unable to segment certain portions of the image due to, for example, artifacts in the image, unrecognizable objects in the image, among other possibilities. In some embodiments, the portions of the image that are unable to be segmented directly may be included in the closest region or may be included in a region for unrecognizable objects, among other possibilities.

At step 1108, an orientation (e.g., orientations 556, 756) of the image is determined. The orientation of the image may be directly related to (e.g., equal to) the orientation of the imaging device. In some embodiments, the orientation of the imaging device may first be determined and subsequently used to determine the orientation of the image. In some embodiments, the orientation of the image may be determined using orientation data captured using an orientation sensor, as described below in step 1110. In some embodiments, the orientation of the image may be determined using GNSS data (e.g., GNSS data 258, 358, 558) related to the plurality of GNSS signals. In some embodiments, the orientation of the image may be determined using the image itself.

In one example, when the GNSS antenna is a triple-element GNSS antenna, the orientation of the image may be determined solely using GNSS data. In some embodiments, the orientation of the image may be determined both using the orientation data and the GNSS data. For example, a first partial orientation may be determined using the orientation data and a second partial orientation may be determined using the GNSS data. For example, when the GNSS antenna is a dual-element, the first partial orientation may include the pitch and roll of the imaging device (and likewise the image) and the second partial orientation may include the heading of the imaging device (and likewise the image).

At step 1110, orientation data (e.g., orientation data 254, 354, 554, 754) is captured using an orientation sensor (e.g., orientation sensors 214, 314, 414, 514, 714). The orientation sensor may be mounted to the antenna structure such that the rotational movement of the orientation sensor is indicative of the rotational movement of the imaging device. The orientation data may include one or more angles, one or more angular velocities, one or more angular accelerations, or the raw data used for their computation. The orientation sensor may be an IMU, a gyroscope, a tilt sensor, among other possibilities.

At step 1112, the plurality of GNSS satellites are projected onto the image based on the orientation of the image such that a corresponding region is identified for each of the plurality of GNSS satellites. In some embodiments, a pixel location within the image is first determined for each of the plurality of GNSS satellites. The pixel location may be the location within the image at which an orbital position of each of the plurality of GNSS satellites is aligned or found. The orbital position of each of the plurality of GNSS satellites may be determined by analyzing GNSS data or be obtained through other means (e.g., the orbital positions may be obtained over the internet).

In some embodiments, a position of the image may be computed prior to performing step 1112 so that the pose of the image may be known. Upon determining the pose, the plurality of GNSS satellites may be projected onto the image based on both the position and orientation of the image. In some embodiments, a first estimate of the geospatial position may be used as the position of the image. In such embodiments, method 1100 may further include receiving the first estimate of the geospatial position and using the first estimate as the position of the image.

At step 1114, each of the plurality of GNSS signals is processed in accordance with the corresponding region for a corresponding GNSS satellite of the plurality of GNSS satellites. For example, each of the plurality of GNSS signals may be processed differently based on their corresponding region. In one example, any GNSS signal that is transmitted from a GNSS satellite that is projected onto the image within a first region is used to compute the geospatial position in an ordinary manner, any GNSS signal that is transmitted from a GNSS satellite that is projected onto the image within a second region is used to compute the geospatial position in an altered manner, and any GNSS signal that is transmitted from a GNSS satellite that is projected onto the image within a third region is ignored and not used to compute the geospatial position.

At step 1116, each of the plurality of GNSS signals is weighted in accordance with a weight for the corresponding region for the corresponding GNSS satellite. The system may maintain a set of weights (e.g., in a weight table) that includes a weight for each of the plurality of regions. Each weight may include a numerical value and may correspond to an extent to which the corresponding GNSS signal is used to compute the geospatial position. In one example, the pseudorange computed for a particular GNSS signal is weighted in accordance with the weight. The pseudorange may be associated with an error range that may be used in computing the geospatial position, such that GNSS signals with higher weights have smaller errors associated with their pseudoranges than GNSS signals with lower weights.

At step 1118, the geospatial position is computed based on the processed plurality of GNSS signals. As described in step 1114, the algorithm to compute the geospatial position may treat each of the plurality of GNSS signals differently based on its corresponding region. As described in step 1116, the pseudorange computed for each of the plurality of GNSS signals may be weighted based on the weight for the corresponding region.

Figure 12:
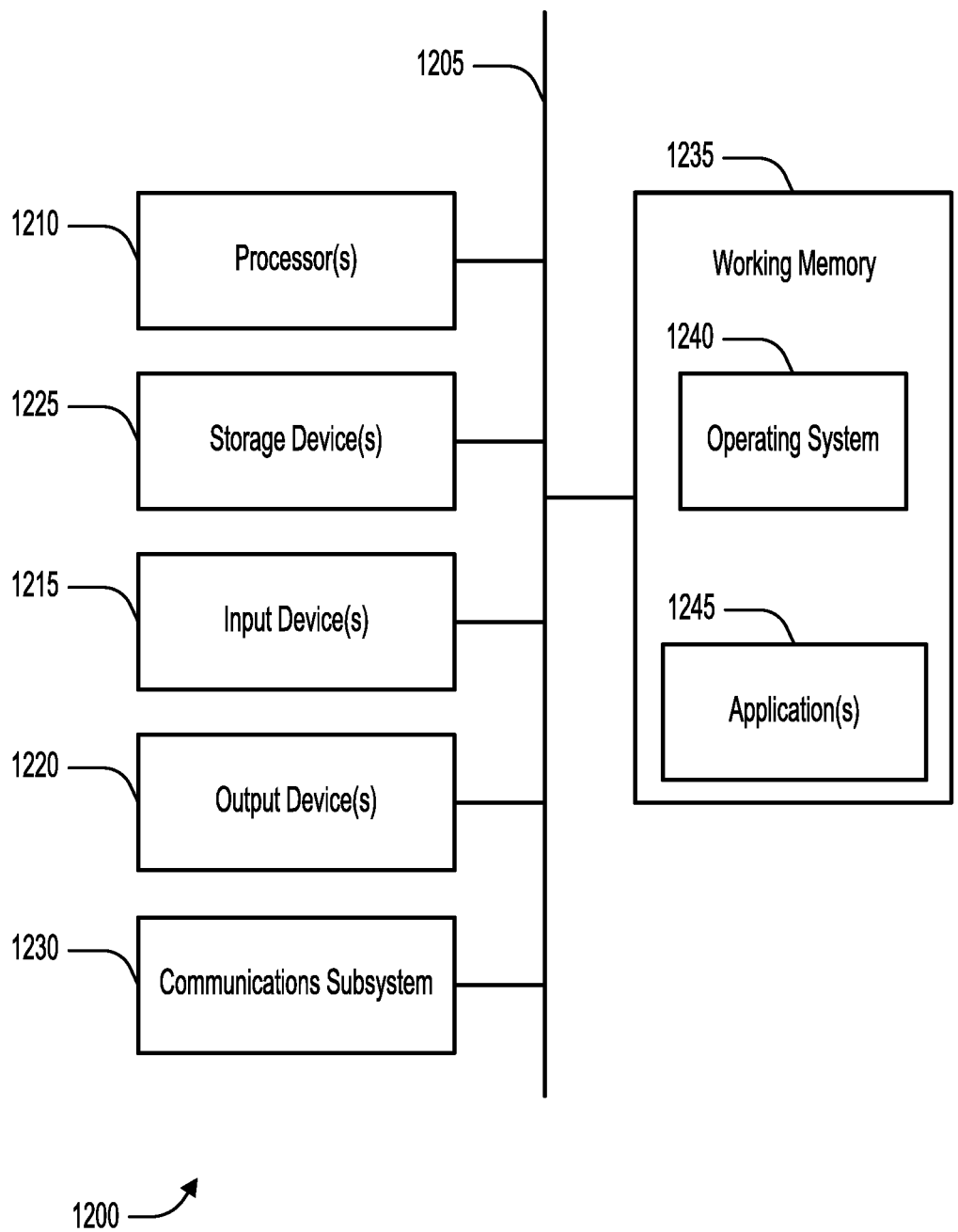
FIG. 12 illustrates a simplified computer system.

FIG. 12 illustrates a simplified computer system 1200, according to some embodiments of the present disclosure. FIG. 12 provides a schematic illustration of one embodiment of computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or more integrated manner.

Computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include, without limitation a mouse, a keyboard, a camera, and/or the like; and one or more output devices 1220, which can include, without limitation a display device, a printer, and/or the like.

Computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1200 might also include a communications subsystem 1230, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1230 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1230. In other embodiments, a portable electronic device, e.g. the first electronic device, may be incorporated into computer system 1200, e.g., an electronic device as an input device 1215. In some embodiments, computer system 1200 will further comprise a working memory 1235, which can include a RAM or ROM device, as described above.

Computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1200 and/or might take the form of source and/or installable code, which, upon compilation and/or installation on computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1200 to perform methods in accordance with various embodiments of the technology. According to a set of embodiments, some or all of the procedures of such methods are performed by computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1200.

The communications subsystem 1230 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of processing satellite signals for computing a geospatial position, the method comprising:
   receiving a plurality of GNSS signals from a plurality of GNSS satellites;
   capturing a single image using an imaging device at least partially oriented toward the plurality of GNSS satellites;
   segmenting said single image into a plurality of regions based on RF characteristics of objects in said single image;
   determining an orientation of said single image;
   projecting the plurality of GNSS satellites onto said single image based on the orientation of said single image such that a corresponding region is identified for each of the plurality of GNSS satellites; and
   processing each of the plurality of GNSS signals in accordance with the corresponding region for a corresponding GNSS satellite of the plurality of GNSS satellites.

2. The method of claim 1, wherein the plurality of GNSS signals are received via a GNSS antenna, and wherein the GNSS antenna and the imaging device are mounted to an antenna structure.

3. The method of claim 2, wherein determining the orientation of said single image includes:
   capturing orientation data using an orientation sensor mounted to the antenna structure, wherein the orientation of said single image is determined based on the orientation data.

4. The method of claim 2, wherein the GNSS antenna is a multi-element antenna, and wherein the imaging device is positioned within a threshold distance of a phase center of the multi-element antenna.

5. The method of claim 1, wherein each particular region of the plurality of regions is characterized by an extent to which the plurality of GNSS signals are obstructed by the objects within the particular region.

6. The method of claim 1, wherein processing each of the plurality of GNSS signals in accordance with the corresponding region for the corresponding GNSS satellite includes:
   weighting each of the plurality of GNSS signals in accordance with a weight for the corresponding region for the corresponding GNSS satellite.

7. The method of claim 1, further comprising:
   computing the geospatial position based on the processed plurality of GNSS signals.

8. The method of claim 1, wherein projecting the plurality of GNSS satellites onto said single image based on the orientation of said single image includes determining a pixel location within said single image for each of the plurality of GNSS satellites.

9. A system for processing satellite signals for computing a geospatial position, the system comprising:
   an antenna structure;
   a GNSS antenna mounted to the antenna structure and configured to receive a plurality of GNSS signals from a plurality of GNSS satellites;
   an imaging device mounted to the antenna structure and configured to capture a single image while being at least partially oriented toward the plurality of GNSS satellites; and
   a processor that is communicatively coupled with the GNSS antenna and the imaging device and is configured to perform operations comprising:
      segmenting said single image into a plurality of regions based on RF characteristics of objects in said single image;
      determining an orientation of said single image;
      projecting the plurality of GNSS satellites onto said single image based on the orientation of said single image such that a corresponding region is identified for each of the plurality of GNSS satellites; and
      processing each of the plurality of GNSS signals in accordance with the corresponding region for a corresponding GNSS satellite of the plurality of GNSS satellites.

10. The system of claim 9, further comprising:
    an orientation sensor mounted to the antenna structure and configured to capture orientation data, wherein the orientation of said single image is determined based on the orientation data.

11. The system of claim 9, wherein the GNSS antenna is a multi-element antenna, and wherein the imaging device is positioned within a threshold distance of a phase center of the multi-element antenna.

12. The system of claim 9, wherein each particular region of the plurality of regions is characterized by an extent to which the plurality of GNSS signals are obstructed by the objects within the particular region.

13. The system of claim 9, wherein processing each of the plurality of GNSS signals in accordance with the corresponding region for the corresponding GNSS satellite includes:
    weighting each of the plurality of GNSS signals in accordance with a weight for the corresponding region for the corresponding GNSS satellite.

14. The system of claim 9, wherein the operations further comprise:
    computing the geospatial position based on the processed plurality of GNSS signals.

15. The system of claim 9, wherein projecting the plurality of GNSS satellites onto said single image based on the orientation of said single image includes determining a pixel location within said single image for each of the plurality of GNSS satellites.

16. A non-transitory computer-readable medium comprising instructions that, when executed by one or more processors, cause the one or more processors to perform operations comprising:
    receiving a plurality of GNSS signals from a plurality of GNSS satellites;
    capturing a single image using an imaging device at least partially oriented toward the plurality of GNSS satellites;
    segmenting said single image into a plurality of regions based on RF characteristics of objects in said single image;
    determining an orientation of said single image;
    projecting the plurality of GNSS satellites onto said single image based on the orientation of said single image such that a corresponding region is identified for each of the plurality of GNSS satellites; and
    processing each of the plurality of GNSS signals in accordance with the corresponding region for a corresponding GNSS satellite of the plurality of GNSS satellites.

17. The non-transitory computer-readable medium of claim 16, wherein the plurality of GNSS signals are received via a GNSS antenna, and wherein the GNSS antenna and the imaging device are mounted to an antenna structure.

18. The non-transitory computer-readable medium of claim 17, wherein determining the orientation of said single image includes:
   capturing orientation data using an orientation sensor mounted to the antenna structure, wherein the orientation of said single image is determined based on the orientation data.

19. The non-transitory computer-readable medium of claim 17, wherein the GNSS antenna is a multi-element antenna, and wherein the imaging device is positioned within a threshold distance of a phase center of the multi-element antenna.

20. The non-transitory computer-readable medium of claim 16, wherein processing each of the plurality of GNSS signals in accordance with the corresponding region for the corresponding GNSS satellite includes:
   weighting each of the plurality of GNSS signals in accordance with a weight for the corresponding region for the corresponding GNSS satellite.

* * * * *